US009511620B2

(12) United States Patent
Triepel et al.

(10) Patent No.: US 9,511,620 B2
(45) Date of Patent: Dec. 6, 2016

(54) HOT STAMPING MACHINE

(71) Applicant: LEONHARD KURZ Stiftung & Co. KG, Furth (DE)

(72) Inventors: Michael Triepel, Furth (DE); Ralph Bieber, Cadolzburg (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 0 days.

(21) Appl. No.: 14/435,785

(22) PCT Filed: Oct. 22, 2013

(86) PCT No.: PCT/EP2013/072087
§ 371 (c)(1),
(2) Date: Apr. 15, 2015

(87) PCT Pub. No.: WO2014/064114
PCT Pub. Date: May 1, 2014

(65) Prior Publication Data

US 2015/0298491 A1 Oct. 22, 2015

(30) Foreign Application Priority Data

Oct. 24, 2012 (DE) ........................ 10 2012 110 149

(51) Int. Cl.
*B32B 37/00* (2006.01)
*B44B 5/02* (2006.01)
(Continued)

(52) U.S. Cl.
CPC ........... *B44B 5/028* (2013.01); *B41F 16/0026* (2013.01); *B41F 16/0093* (2013.01);
(Continued)

(58) Field of Classification Search
CPC .... B41F 16/0026; B41F 16/0093; B44C 1/17; B44C 1/1729; B44B 5/0047; B44B 5/028
(Continued)

(56) References Cited

U.S. PATENT DOCUMENTS 3,850,213 A * 11/1974 Keaton .................... B30B 5/06
100/154
4,267,224 A 5/1981 Kanzelberger
(Continued)

FOREIGN PATENT DOCUMENTS

CN 201736707 2/2011
DE 4309400 9/1993
(Continued)

OTHER PUBLICATIONS

English translation of DE4309400.*
English translation of EP0433575.*
English translation of DE19602153.*

*Primary Examiner* — James Sells
(74) *Attorney, Agent, or Firm* — Hoffmann & Baron, LLP

(57) ABSTRACT

A hot-stamping device (1) is described, having a stamping device (2) for transferring a transfer layer (15*u*) disposed on a carrier layer (15*t*) of a hot-stamping foil (15) on to a substrate (14). The hot-stamping device comprises a heatable stamping roller (11) and a counter-pressure roller (12), between which a stamping gap (16) is realized, and comprising a separating device (3), disposed downstream, for separating the carrier layer (15*t*) from the transfer layer (15*u*) transferred on to the substrate (14). A flat support element (18) is disposed under the stamped substrate (17), between the stamping gap (16) and the separating device (3), directly adjoining the stamping gap (16) or at a distance of <1 mm from the stamping gap (16) or overlapping the stamping gap (16).

15 Claims, 3 Drawing Sheets

(51) Int. Cl.
*B44B 5/00* (2006.01)
*B44C 1/17* (2006.01)
*B41F 16/00* (2006.01)

(52) U.S. Cl.
CPC .............. *B44B 5/0047* (2013.01); *B44C 1/17* (2013.01); *B44C 1/1729* (2013.01)

(58) Field of Classification Search
USPC ....................................... 156/247, 249, 583.5
See application file for complete search history.

(56) References Cited

U.S. PATENT DOCUMENTS

| | | | | | |
|---|---|---|---|---|---|
| 4,287,017 | A * | 9/1981 | Lopata | B41F 16/02 | 101/470 |
| 4,312,686 | A * | 1/1982 | Smith | B29C 43/305 | 156/209 |
| 4,397,710 | A * | 8/1983 | Gaylord | B44C 1/16 | 101/33 |
| 5,207,855 | A | 5/1993 | Nyfeler | | |
| 5,487,801 | A * | 1/1996 | Marion | B32B 37/0053 | 156/247 |
| 5,921,175 | A | 7/1999 | Bates | | |
| 6,296,034 | B1 * | 10/2001 | Kodera | B41M 7/0009 | 101/423 |
| 6,435,247 | B1 * | 8/2002 | Kerr | B32B 37/1027 | 100/151 |
| 7,824,516 | B2 * | 11/2010 | Amos | B29C 39/148 | 156/230 |
| 2006/0027315 | A1 * | 2/2006 | Merino Rojo | B29C 43/203 | 156/247 |

FOREIGN PATENT DOCUMENTS

| | | |
|---|---|---|
| DE | 19602153 | 2/1999 |
| DE | 10159661 | 2/2003 |
| EP | 0191592 | 10/1990 |
| EP | 0433575 | 6/1991 |
| WO | WO0016980 | 3/2000 |

* cited by examiner

HOT STAMPING MACHINE

This application claims priority based on an International Application filed under the Patent Cooperation Treaty, PCT/EP2013/072087, filed on Oct. 22, 2013, and German Application No. DE 102012110149.3, filed on Oct. 24, 2012.

BACKGROUND OF THE INVENTION

The invention relates to a hot-stamping device according to the preamble of the subject-matter of claim 1.

Hot-stamping devices are used to transfer a transfer layer disposed on a carrier layer of a hot-stamping foil on to a substrate by the action of temperature and pressure. For this, a heated stamping roller is provided, which acts in combination with a counter-pressure roller. By means of a separating apparatus, the carrier layer is drawn off downstream, after a stamping gap realized between the stamping roller and the counter-pressure roller, from the transfer layer that is transferred on to the substrate. If a profiled stamping roller is used, only regions of the transfer layer, in particular corresponding to the shape of the profiling on the stamping roller, are transferred on to the substrate, with the result that the drawn-off carrier layer also has residues of the transfer layer, in particular corresponding to the negative shape of the profiling on the stamping roller.

A hot-stamping device of the type described is known from DE 10159661 C1.

In the space between the stamping gap and the separating apparatus, the transfer layer can still be separated relatively easily from the substrate, at least close to the stamping gap, because the composite of substrate and hot-stamping foil still has a relatively high temperature, and there is no longer an active contact force. If the carrier film becomes separated too soon, impurities occur in the stamping, particularly in the case of fine and very fine structures. Increasingly, structured transfer layers are used, having very fine structures that may be composed, for example, of a toner applied to the carrier layer in a printing process, as described in EP 0191592 B1.

The object of the present invention is to specify a hot-stamping device that avoids the impurities in the stamping.

SUMMARY OF THE INVENTION

According to the invention, this object is achieved with the subject-matter of claim 1. A hot-stamping device is proposed having a stamping device for transferring a transfer layer disposed on a carrier layer of a hot-stamping foil on to a substrate, comprising a heatable stamping roller and a counter-pressure roller, between which a stamping gap is realized, and comprising a separating device, disposed downstream, for separating the carrier layer from the transfer layer transferred on to the substrate, wherein it is provided that a flat support element for the stamped substrate is disposed under the substrate, between the stamping gap and the separating device, directly adjoining the stamping gap or at a distance of <1 mm from the stamping gap or overlapping the stamping gap.

The hot-stamping device according to the invention has a flat support element that, in the portion between the stamping gap and the separating device that is decisive for the quality of the stamping, provides the coated substrate with a support surface on which the coated substrate is supported over its entire area. The hot-stamping device may be a production station in a production facility operating according to the reel-to-reel principle. The substrate may be processed according to the reel-to-reel principle, i.e. wound off endlessly from a reel, then processed, and then wound up again. The substrate may also be processed as sheets, wherein the individual sheets are supplied from a stack and, after processing, are again collected on a stack. The hot-stamping foil is usually processed according to the reel-to-reel principle, i.e. wound off endlessly from a reel, then processed, and then would up again.

It may be provided that the support element is made of a material having a degree of hardness in the range of from 60° Shore A to 95° Shore A, preferably in the range of from 80° Shore A to 95° Shore A and/or a degree of hardness in the range of from 450 HV 10 (HV=Vickers hardness) to 520 HV 10, preferably in the range of from 465 HV 10 to 500 HV 10. Owing to this range of hardness, the support element can serve, particularly advantageously, as a mechanical counter-bearing for the substrate and the hot-stamping foil supported thereon, and prevent premature separation of the transfer layer and/or of the carrier layer from the substrate, in particular in the case of structures of the applied transfer layer that are of a particularly fine resolution.

Further, it may be provided that the support element is a rigid element, the maximum deflection of which, in the case of appropriate operational loading, is less than 10 μm, or is in the range of from approximately 1 μm to 10 μm. Since the degree of deflection is so slight, the support element can serve, particularly advantageously, as a mechanical counter-bearing for the substrate and the hot-stamping foil supported thereon, and prevent premature separation of the transfer layer and/or of the carrier layer from the substrate.

It may be provided, in an advantageous realization, that the support element is made of high-grade steel. A support element made of high-grade steel can impart, in particular, the aforementioned properties in respect of hard surface and slightness of deflection, and is particularly suitable as a mechanical counter-bearing for the substrate and the hot-stamping foil supported thereon. A further advantageous property of a support element made of high-grade steel is that, owing to the high thermal conductivity of high-grade steel, excess heat can be removed from the stamping gap, advantageously, by means of the belt. Particularly in the case of long stamping processes that run without interruption, it has been found that, in particular, the counter-pressure roller becomes ever hotter, despite additional cooling measures, and the stamping conditions in the stamping gap slowly deteriorate as a result. A support element made of high-grade steel can now additionally dissipate thermal energy out of the stamping gap, thereby allowing improved setting and control of the stamping conditions in the stamping gap.

Alternatively, it may be provided that the support element is made of copper, aluminum, of other steel or high-grade steel alloys, titanium, paper, foil, or fiber-reinforced material.

It may be provided, in an advantageous realization, that the support element is realized as a support plate. Since, in the case of a support plate, a relative movement occurs between the surface of the support plate and the underside of the coated substrate, the surface is preferably polished, i.e. designed for minimal friction, wherein the deviations of the support surface from an ideal plane are negligible.

The end portion of the support plate that faces towards the stamping gap may preferably be realized in the shape of a blade. Owing to the blade-type design, the required distance of <1 can be set between the support plate and the stamping gap.

In a further advantageous realization, it may be provided that the support element is realized as a continuous belt. In this case, a relative movement between the surface of the support plate and the underside of the coated substrate can be avoided if the belt is carried on the counter-pressure roller. Also in this case of this realization, it has proved successful if the surface is polished, i.e. the deviations of the support surface from an ideal plane are negligible.

It may be provided that the belt is realized as a seamless belt. A seamless belt without butt joints offers the same conditions, in respect of its property as a mechanical counter-bearing for the substrate and the hot-stamping foil supported thereon, over its entire surface. Commensurate with these consequently advantageously constant mechanical properties, the rest of the stamping parameters can be set in a correspondingly precise and constant manner.

Further, it may be provided that the seamless belt has a thickness in the range of from 0.2 mm to 0.5 mm, preferably in the range of from 0.3 mm to 0.35 mm. A belt of this thickness, or gauge, is able, in particular, to impart the aforementioned properties in respect of hard surface and slightness of deflection, and is particularly suitable as a mechanical counter-bearing for the substrate and the hot-stamping foil supported thereon.

In a further realization, it may be provided that the belt is realized as a link belt of plate-type links, wherein adjacent links are connected to each other by a pivot joint, such that, when in the extended state, they form a gap-free, in particular largely homogeneous, support surface. The link belt may have peripheral transport recesses, and the return roller may have corresponding sprockets that engage in the transport recesses.

The stamping roller may have a coating of an elastomer having a thickness in the range of from 3 to 10 mm, preferably in the range of from 5 mm to 10 mm. As a stamping pressure develops, the surface of the coating becomes deformed, such that, instead of a linear stamping gap, a planiform stamping gap is realized. The stamping gap may have, for example, a width of from 5 mm to 20 mm. It has proved successful to set a stamping gap with a width of from 5 mm of 10 mm. The associated stamping pressure may be, for example, in the range of from 1 bar to 6 bar. It has proved successful to select the stamping pressure in the range of from 3 bar to 6 bar.

The elastomer may preferably be silicone rubber.

It may be provided that the coating has a degree of hardness in the range of from 60° Shore A to 95° Shore A, preferably in the range of from 70° Shore A to 90° Shore A.

In a further realization, it may be provided that the support element is realized as the end face of a sonotrode of an ultrasonic bearing apparatus. The ultrasonic bearing apparatus comprises the sonotrode and an ultrasonic transducer. An air film, on which the stamped substrate slides, is realized between the sonotrode and the underside of the stamped substrate through the action of the ultrasound. In the bearing gap that is produced as a result, a pressure is built up between the end face of the sonotrode and the underside of the stamped substrate, which pressure, like the thickness of the air film, can be set with precision. It is also possible to realize the end face of the sonotrode with suction openings, which are connected to a vacuum pump via channels in order to draw in the substrate by suction, against the pressure in the bearing gap, and thus to enable the bearing gap to be set with yet greater precision by means of the ensuing equilibrium pressure.

In order to heat the stamping roller, a heating apparatus disposed outside of the stamping roller may be provided. Preferably, an infrared radiation heating apparatus, having a temperature controller, may be provided. The stamping temperature may be in the range of from 100° C. to 250° C., preferably in the range of from 130° C. to 190° C.

A heating apparatus disposed inside the stamping roller may also be provided. Such a heating apparatus inside the stamping roller may be, for example, an electric heating element, in particular a heating coil or heating spiral. Likewise, a temperature-controlled oil circuit which heats the stamping roller to the desired temperature may be disposed inside the stamping roller.

BRIEF DESCRIPTION OF THE DRAWINGS

The invention is now explained in more detail with reference to embodiment examples. There are shown in FIG. 1 a first embodiment example of the hot-stamping device according to the invention, in a schematic representation.

DETAILED DESCRIPTION OF THE INVENTION

Figure 1:
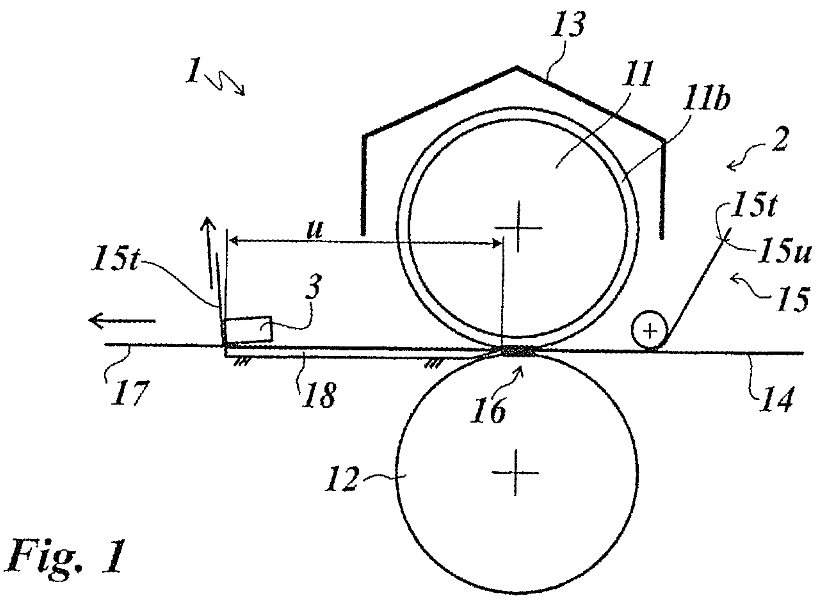

FIG. 1 shows a hot-stamping device 1 having a stamping device 2 and a separating device 3. The stamping device 2 comprises a stamping roller 11, a counter-pressure roller 12 and a heating apparatus 13.

On its external circumference, the stamping roller 11 has a coating 11*b* of an elastomer, having a thickness in the range of from 3 to 10 mm, preferably in the range of from 5 to 10 mm. The elastomer is preferably silicone rubber. In the embodiment example represented in FIG. 1, the silicone rubber has a hardness of 80° Shore A. The counter-pressure roller 12 is made of steel.

The heating apparatus 13 is disposed above the stamping roller 11 and, in the embodiment example represented in FIG. 1, is realized as infrared radiation heating controlled by means of a temperature controller.

Supplied upstream before the stamping device 2 are a substrate 14 to be stamped and a hot-stamping foil 15, which are joined together in a stamping gap 16 realized between the stamping roller 11 and the counter-pressure roller 12, with a stamping pressure being formed.

The hot-stamping foil 15 has a transfer layer 15*u* disposed on a carrier layer 15*t*. The carrier layer 15*t* may be made, for example, of PET or of polypropylene, polystyrene, PVC, PMMA, ABS, polyamide. The hot-stamping foil 15 is disposed such that the transfer layer 15*u* faces towards the top side of the substrate 14 to be stamped. The transfer layer 15*u* may be coated with an adhesive layer that can be activated by heat, or it may be realized as a self-adhesive layer (cold adhesive). A parting layer, which facilitates the separation of the transfer layer 15u from the carrier layer 15t, may be disposed between the transfer layer 15u and the carrier layer 15t.

The transfer layer of the hot-stamping foil generally has a plurality of layers, in particular a separation layer (for example, of wax or compounds containing wax), a protective lacquer layer, an adhesive layer that can be activated by heat. It may additionally contain one or more decoration layers and/or functional layers, applied over part of the surface or over the entire surface. Decoration layers are, for example, colored (opaque or transparent or translucent) lacquer layers, metallic layers or relief structures (haptic or optically refractive or optically diffractive in their effect). Functional layers are, for example, electrically conducting layers (metal, ITO (ITO=indium tin oxide)), electrically semiconducting layers (for example, semiconductor polymers), or electrically non-conducting layers (electrically insulating lacquer layers), or layers that are optically matt or anti-reflective in their effect (for example, having microscopic matt structures), or structures that modify the adhesion action and/or the surface tension (lotus-effect structures or similar). Additional auxiliary layers, in particular adhesion promoting layers, may be present between the individual layers. The individual layers of the transfer layer are approximately between 1 nm and 50 μm thick.

The substrate 14 to be stamped is preferably a flexible substrate, for example paper having a weight per unit area of 30 g/m$^2$ to 350 g/m$^2$, preferably 80 g/m$^2$ to 350 g/m$^2$, cardboard, plastic or a hybrid material or a laminate.

A stamped substrate 17, which is still joined to the carrier layer 15t, is realized as a result of the transfer layer 15u being transferred on to the substrate 14.

The width of the stamping gap 16 is determined substantially by the stamping pressure and by the local deformation of the coating 11b of the stamping roller 11 that occurs under the stamping pressure. The stamping gap 16 has a width of from 5 to 20 mm, preferably a width of from 5 to 10 mm. A stamping pressure of from 1 bar to 6 bar, preferably a stamping pressure of from 3 bar to 6 bar, is generated in the stamping gap 16. The stamping temperature may be in the range of from 100° C. to 250° C., preferably in the range of from 130° C. to 190° C. The transfer layer 15u is transferred on to the substrate 14 at a speed of up to 75 m/min. The values to be set for pressure, temperature and speed depend on numerous parameters, such as the material properties of the hot-stamping foil used, the stamping decor and the material properties of the substrate. Owing to the multiplicity of dependences, a mathematical modelling is so elaborate that the above-mentioned values are preferably determined by experiments, starting from a basic setting of the hot-stamping device 1.

The carrier layer 15t is separated from the stamped substrate 17 in the separating device 3 disposed downstream after the stamping device 2. The separating device 3 may be realized, for example, as a bar, having a separating edge, disposed above the stamped substrate 17 that is joined to the carrier layer 15t. The carrier layer 15t is drawn over the separating edge and supplied to a wind-up reel, not represented.

A rigid, flat support plate 18 is disposed under the stamped substrate 17, between the stamping gap 16 and the separating device 3, at a distance of <1 mm from the stamping gap, such that the stamped substrate 17 emerging from the stamping gap 16 is supported over its entire area on the support plate 18. The end portion of the support plate 18 that faces towards the stamping gap 16 is realized in the shape of a blade, with the result that a distance of <1 mm can be set between stamping gap 16 and the end edge of the support plate 18 that faces towards the stamping gap 16. The support plate 18 is preferably made of high-grade steel, as a plywood plate, or a plastic plate having an appropriate surface treatment (surface coating). The top side of the support plate 18 that faces towards the coated substrate 17 is preferably realized with a polished surface, i.e. having a mean peak-to-valley height of <0.1 μm.

Transport devices, and supply and wind-up reels for the substrate 14, 17 and the hot-stamping foil 15, or the carrier layer 15t, are not represented in the embodiment examples represented in FIGS. 1 to 6. It may be provided that the hot-stamping device 1 is a production station in a production facility operating according to the reel-to-reel principle.

Figure 2:
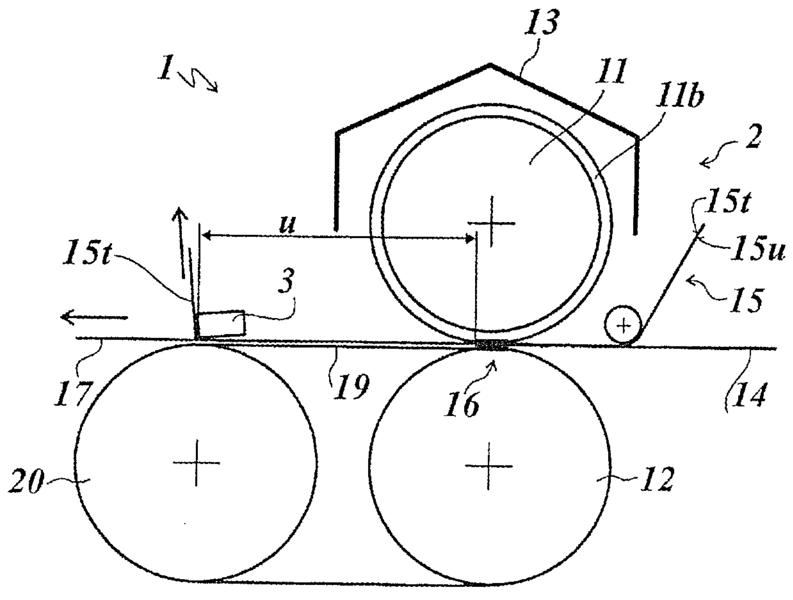
FIG. 2 a second embodiment example of the hot-stamping device according to the invention, in a schematic representation.

FIG. 2 shows a hot-stamping device 1, which is realized in the same way as the hot-stamping device described in FIG. 1, with the difference that a seamless belt 19 is provided as a rigid, flat support element between the stamping gap 16 and the separating device 3. The seamless belt 19 forms a rigid bearing apparatus that overlaps the stamping gap 16. The seamless belt 19 is guided on the counter-pressure roller 12 and a return roller 20, wherein the bearing distance of the counter-pressure roller 12 and a return roller 20 is set such that the belt 19 is subjected to such a tensile force that it forms a rigid, flat support surface for the coated substrate 17.

In a preferred embodiment, the belt 19 is made of high-grade steel. A material other than high-grade steel may also be provided, for example silicone, coated rubber, paper, foil or fiber-reinforced material. What is important is that the belt material, in the case of a belt of high-grade steel, has a degree of hardness in the range of from 450 HV 10 to 520 HV 10, preferably in the range of from 465 HV 10 to 500 HV 10 (HV=Vickers hardness), and in the case of silicone or coated rubber has a degree of hardness in the range of from 60° Shore A to 95° Shore A, preferably in the range of from 80° Shore A to 95° Shore A.

The aforementioned belt of high-grade steel is realized with a thickness in the range of from 0.2 mm to 0.5 mm, preferably in the range of from 0.3 mm to 0.35 mm.

In the case of the belt 19 made of high-grade steel, it has been found to be advantageous that it prevents overheating in the stamping gap 16 because, owing to its very good thermal conduction, it removes excess heat from the stamping gap.

In a case example, the following stamping parameters, for example, have been set:

| | |
|---|---|
| Temperature on the surface of the stamping roller 11: | 150-155° C. |
| Temperature control setting: | 160° C. |
| Stamping pressure: | 4 bar |
| Advance speed: | 15 m/min |
| Material of the hot-stamping foil: | KURZ Digital Metal DT- H Silver |
| Toner: | HP Indigo ElectroInk black |
| Material of the substrate: | Digital Silver Bilderdruck [illustration printing] Material 200 g/m$^2$ |
| Sheet size: | 500 × 320 mm |

Figure 3:
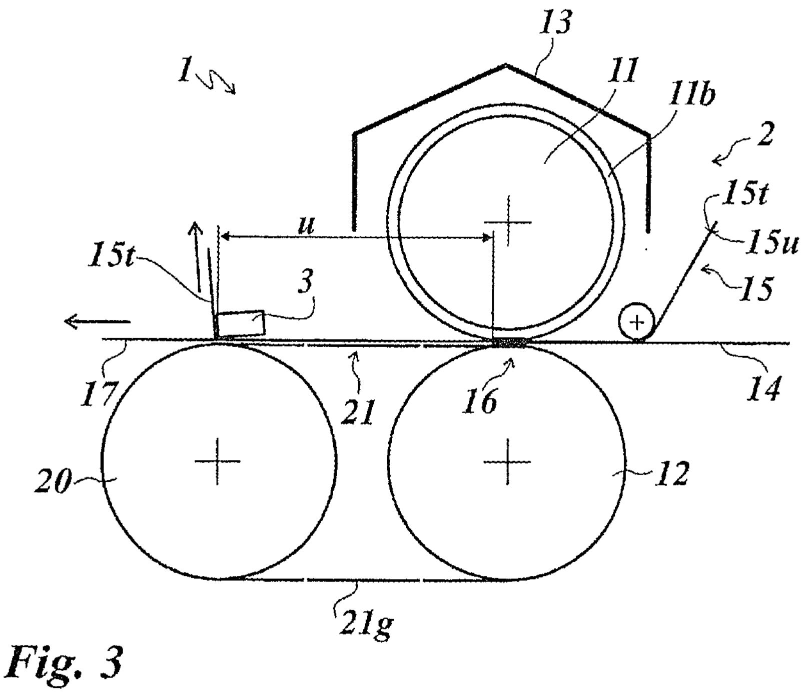
FIG. 3 a third embodiment example of the hot-stamping device according to the invention, in a schematic representation.

FIG. 3 shows a hot-stamping device 1, which is realized in the same way as the hot-stamping device described in FIG. 2, with the difference that, instead of the seamless belt 19, a link belt 21 of plate-type links 21g is provided, wherein adjacent links 21*g* are connected to each other by a pivot joint, such that, when in the extended state, they form a gap-free, flat support surface.

The link belt 21 may have peripheral transport recesses, and the return roller 20 may have corresponding sprockets that engage in the transport recesses.

Figure 4:
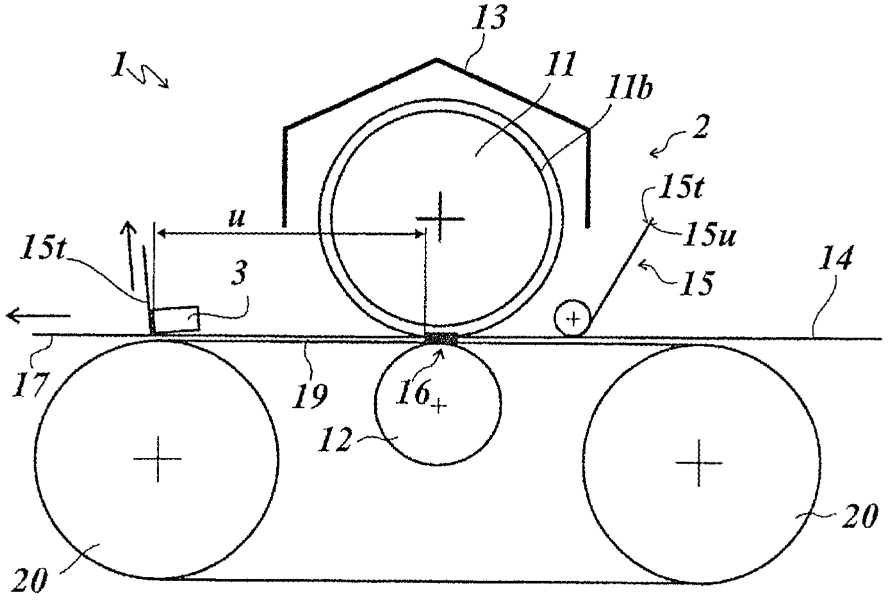
FIG. 4 a fourth embodiment example of the hot-stamping device according to the invention, in a schematic representation.

FIG. 4 shows a hot-stamping device 1, which is realized in the same way as the hot-stamping device described in FIG. 2, with the difference that a further return roller 20 is provided, and the counter-pressure roller 12 only performs the function of applying the counter-pressure for stamping. In the embodiment example represented in FIG. 4, therefore, the counter-pressure roller 12 has a lesser diameter than the two return rollers 20.

Figure 5:
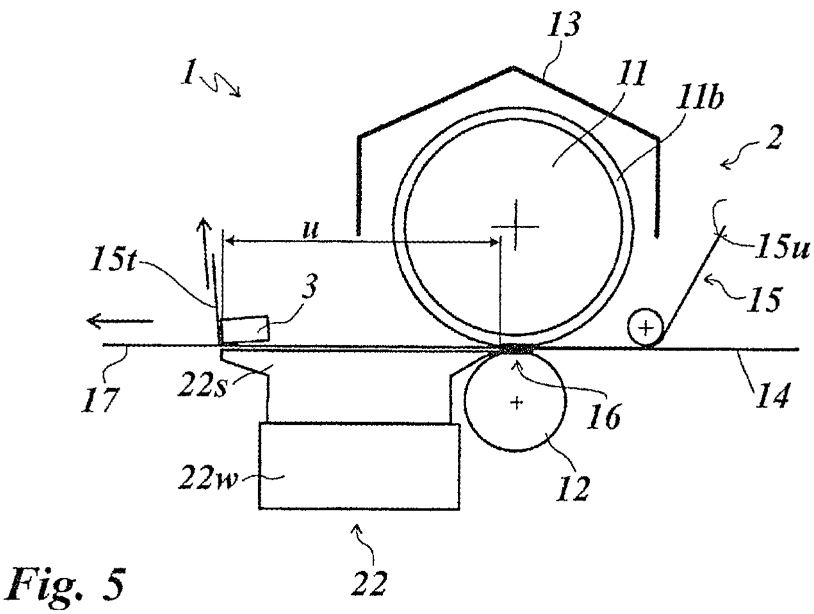
FIG. 5 a fifth embodiment example of the hot-stamping device according to the invention, in a schematic representation.

FIG. 5 shows a hot-stamping device 1, which is realized in the same way as the hot-stamping device described in FIG. 1, with the difference that an ultrasonic bearing apparatus 22 is provided, as a rigid, flat support element, between the stamping gap 16 and the separating device 3. The ultrasonic bearing apparatus comprises a sonotrode 22*s* and an ultrasonic transducer 22*w*. An air film of constant thickness, on which the stamped substrate 17 is supported and slides, is realized between the sonotrode 22*s* and the underside of the stamped substrate 17 because of the action of the ultrasound. In the bearing gap that is produced as a result, a pressure is built up between the end face of the sonotrode 22*s* and the underside of the stamped substrate 17, which pressure, like the thickness of the bearing gap, can be set with precision. It is also possible to realize the end face of the sonotrode 22*s* with suction openings, which are connected to a vacuum pump via channels in order to draw in the substrate 17 by suction, against the pressure in the bearing gap, and thus to enable the bearing gap to be set with yet greater precision by means of the ensuing equilibrium pressure.

Figure 6:
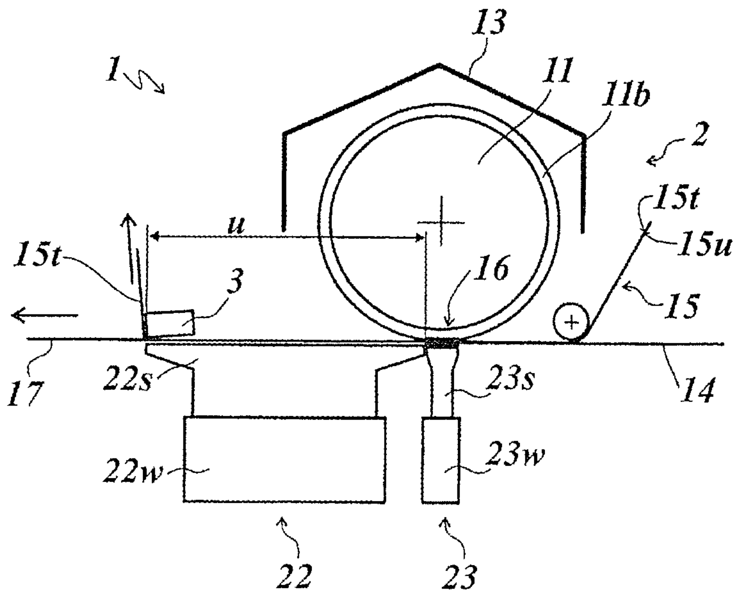
FIG. 6 a sixth embodiment example of the hot-stamping device according to the invention, in a schematic representation.

FIG. 6 shows a hot-stamping device 1, which is realized in the same way as the hot-stamping device described in FIG. 5, with the difference that, instead of the counter-pressure roller, a second ultrasonic bearing apparatus 23 is provided, which comprises a sonotrode 23*s* and an ultrasonic transducer 23*w*. It is also possible to provide only one ultrasonic bearing apparatus, the sonotrode of which has a width that is equal to the sum of the widths of the sonotrodes 22*s* and 23*s*.

LIST OF REFERENCES

1 hot-stamping device
2 stamping device
3 separating device
11 stamping roller
11*b* coating
12 counter-pressure roller
13 heating apparatus
14 substrate to be stamped
15 hot-stamping foil
15*t* carrier layer
15*u* transfer layer
16 stamping gap
17 stamped substrate
18 support plate
19 seamless belt
20 return roller
21 link belt
21*g* plate-type link
22 ultrasonic bearing apparatus
22*s* sonotrode
22*w* ultrasonic transducer
23 second ultrasonic bearing apparatus
23*s* sonotrode
23*w* ultrasonic transducer

The invention claimed is:

1. A hot-stamping device having a stamping device for transferring a transfer layer disposed on a carrier layer of a hot-stamping foil on to a flexible substrate, comprising a heatable stamping roller and a counter-pressure roller, between which a stamping gap is realized, and comprising a separating device, disposed downstream, for separating the carrier layer from the transfer layer transferred on to the substrate, wherein a flat support element for the stamped substrate is disposed under the stamped substrate, between the stamping gap and the separating device, directly adjoining the stamping gap or at a distance of <1 mm from the stamping gap or overlapping the stamping gap, wherein the support element is made of a material having a degree of hardness in the range of from 60° to 95° Shore A and/or a degree of hardness in the range of from 450 HV 10 (HV=Vickers hardness) to 520 HV 10.

2. A hot-stamping device according to claim 1, wherein the support element is a rigid element, the maximum deflection of which, in the case of appropriate operational loading, is less than 10 μm.

3. A hot-stamping device according to claim 1, wherein the support element is made of high-grade steel.

4. A hot-stamping device according to claim 1, wherein the support element is made of silicone, coated rubber, paper, foil, or fiber-reinforced material.

5. A hot-stamping device according to claim 1, wherein the support element is a support plate.

6. A hot-stamping device according to claim 5, wherein the end portion of the support plate that faces towards the stamping gap is in the shape of a blade.

7. A hot-stamping device according to claim 1, wherein the support element is a continuous belt.

8. A hot-stamping device according to claim 7, wherein the belt is a seamless belt.

9. A hot-stamping device according to claim 8, wherein the seamless belt has a thickness in the range of from 0.2 mm to 0.5 mm.

10. A hot-stamping device according to claim 7, wherein the belt is a link belt of plate-type links, wherein adjacent links are connected to each other by a pivot joint, such that, when in the extended state, they form a gap-free support surface.

11. A hot-stamping device according to claim 1, wherein the stamping roller has a coating of an elastomer having a thickness in the range of from 3 mm to 10 mm.

12. A hot-stamping device according to claim 11, wherein the elastomer is silicone rubber.

13. A hot-stamping device according to claim 11, wherein the coating has a degree of hardness in the range of from 60° to 95° Shore A.

14. A hot-stamping device according to claim 1, wherein the support element is the end face of a sonotrode of an ultrasonic bearing apparatus.

15. A method for hot-stamping a transfer layer from a hot-stamping transfer foil onto a flexible carrier substrate, the method comprising:

feeding a hot-stamping transfer foil together with a flexible carrier substrate to a stamping gap formed between a heated stamping roller and a counter-pressure roller;

hot-stamping a transfer layer from the hot-stamping foil onto the flexible carrier substrate with the heated stamping roller to form a flexible stamped substrate;

supporting the flexible stamped substrate leaving the stamping gap with a flat support element disposed downstream of the stamping gap by a distance of <1 mm;

separating a carrier layer from the transfer layer of the hot-stamping foil in a separating device disposed downstream of the stamping gap, wherein the flat support element terminates at the separating device for supporting the flexible stamped substrate the entire distance between the stamping gap and the separating device.

* * * * *